US 6,526,405 B1

(12) United States Patent
Mannila et al.

(10) Patent No.: US 6,526,405 B1
(45) Date of Patent: Feb. 25, 2003

(54) DETERMINING SIMILARITY BETWEEN EVENT TYPES IN SEQUENCES

(75) Inventors: Heikki O. Mannila, Helsinki (FI); Pirjo Moen, Helsinki (FI)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/438,114

(22) Filed: Dec. 17, 1999

(51) Int. Cl.⁷ ................................................ G06F 17/30
(52) U.S. Cl. ................................ 707/6; 707/4; 707/5
(58) Field of Search ......................................... 707/1–6, 7

(56) References Cited

U.S. PATENT DOCUMENTS

| | | | | |
|---|---|---|---|---|
| 5,664,174 A | * | 9/1997 | Agrawal et al. | 707/3 |
| 5,666,442 A | * | 9/1997 | Wheeler | 382/209 |
| 5,724,573 A | * | 3/1998 | Agrawal et al. | 707/1 |
| 5,742,811 A | * | 4/1998 | Agrawal et al. | 707/5 |
| 5,819,266 A | * | 10/1998 | Agrawal et al. | 707/6 |
| 5,933,821 A | * | 8/1999 | Matsumoto et al. | 707/1 |
| 5,940,825 A | * | 8/1999 | Castelli et al. | 707/2 |
| 6,023,571 A | * | 2/2000 | Matsumoto et al. | 703/2 |
| 6,092,065 A | * | 7/2000 | Floratos et al. | 382/161 |
| 6,108,666 A | * | 8/2000 | Floratos et al. | 706/12 |
| 6,122,628 A | * | 9/2000 | Castelli et al. | 707/2 |
| 6,134,541 A | * | 10/2000 | Castelli et al. | 707/1 |
| 6,278,998 B1 | * | 8/2001 | Ozden et al. | 707/1 |
| 6,289,354 B1 | * | 9/2001 | Aggarwal et al. | 707/104.1 |

OTHER PUBLICATIONS

R. Agrawal, C. Faloutsos, and A. Swami. Efficiency similarity search in sequence databases. In *Proceedings of the 4th International Conference on Foundations of Data Organization and Algorithms* (FODO '93), pp. 69–84, Chicago, Illinois, USA, Oct. 1993. Springer–Verlag.

R. Agrawal, K–I. Lin, H.S. Sawhney, and K. Shim. Fast similarity search in the presence of noise, scaling, and translation in time–series databases. In *Proceedings of the 21st International Conference on Very Large Databases* (VLDB '95), pp. 490–501, Zurich, Switzerland, Sep. 1995. Morgan Kaufmann.

D.Q. Goldin and P.C. Kanellakis. On similarity queries for time–series data: Constraint specification and implementation. In *Proceedings of the 1st International Conference on Principles and Practice of Constraint Programming* (CP '95), Cassis, France, Sep. 1995, Springer–Verlag.

(List continued on next page.)

*Primary Examiner*—Greta Robinson
*Assistant Examiner*—Debbie M. Le
(74) *Attorney, Agent, or Firm*—Watts, Hoffmann, Fisher & Heinke, Co., L.P.A.

(57) ABSTRACT

Determining a degree of relative similarity between event types in event sequences by examining the context of the event types facilitates similarity analysis of large sets of event sequences. A method for determining the similarity between event types in event sequences by examining the data log of the event sequence. A context set of event types is compiled for each event type. The context sets are then compared to determine a degree of similarity between their corresponding event types. The context sets may be compiled by recording the event types which happen within a predetermined time period of the event type in question. The context sets may then be transformed into vectors and a distance calculated between the vectors. The distance indicates a degree of relative similarity between the event types which correspond to the vectors.

2 Claims, 3 Drawing Sheets

OTHER PUBLICATIONS

P. Laird. Identifying and using patterns in sequential data. In *Algorithmic Learning Theory, 4th International Workshop*, pp. 1–18, Berlin, 1993. Springer–Verlag.

H. Mannila and P. Ronkainen. Similarity of event sequences. In *Proceedings of the Fourth International Workshop on Temporal Representation and Reasoning* (Time '97), pp. 136–139, Daytona, Florida, USA, May 1997, IEEE Computer Society Press.

D. Rafiei and A. Mendelzon. Similarity–based queries for time series data. Sigmod *Record (ACM Special Interest Group on Management of Data)*, 26(2):13–25, May 1997.

P. Ronkainen, Attribute similarity and event sequence similarity in data mining. PhLic thesis, Report C–1998–42, University of Helsinki, Department of Computer Science, Helsinki, Finland, Oct. 1998.

* cited by examiner

DETERMINING SIMILARITY BETWEEN EVENT TYPES IN SEQUENCES

TECHNICAL FIELD

The invention relates generally to the field of data mining. More particularly, the invention relates to the field of data mining for sequential data that represents event sequences.

BACKGROUND OF THE INVENTION

Most data mining research has concentrated on set-oriented tabular data. There are, however, important types of data that do not fit within this framework. One such form of data is event sequences that occur in many application areas. An event sequence is an ordered collection of events from a finite set of event types, with each event of the sequence having an occurrence time.

One example of an event sequence is the event or error log from a process such as telecommunications network management. Here the event types are the possible error messages, and the events are actual occurrences of errors at certain times. Also a web access log from a single session of a user can be viewed as an event sequence. In this case, the event types are the web pages, and an individual event is a request for a particular page at a particular time. Other examples of application areas in which event sequences occur are user interface design (event types are different user commands), criminology (types of crime), biostatistics (different symptoms), etc. In each of these applications, the data consists of one or several event sequences. Note that an event sequence is different from a time series in that a time series describes a variable with a continuous value over time, whereas an event sequence consists of discrete events happening in more or less random fashion.

One interesting aspect of event sequences is the degree of similarity between two event types. The definition of similarity may vary depending on the application. For example, if the application is web browsing behavior, two web pages may be considered similar if they convey the same type of information. If the example is computer user interface design, two commands may be similar if they accomplish the same function. Such similarity information is useful in itself, as it provides insight into the data. The similarity of web pages may be used to determine where links may be appropriate. The similarity of computer user commands may be used to select alternative commands to be suggested to the computer user. Moreover, similarities between event types can be used in various ways to make querying the data set more useful.

Because of the increasing difficulty and expense of determining similarity between event types in large sets of event sequences, it is desirable to provide a method of determining similarity between event types by merely scanning and interpreting the data in the database. Such a method would do away with the need to compare the content of event types to determine their similarity.

SUMMARY OF THE INVENTION

Determining a degree of relative similarity between event types in event sequences by examining the context of the event types facilitates similarity analysis of large sets of event sequences.

An event sequence may be defined as an ordered collection of events from a finite set of event types, with each event of the sequence having an occurrence time. An event may be defined as a tuple containing two elements, an event type and an occurrence time.

The present invention determines the similarity between a plurality of event types in at least one event sequence. The invention may be implemented in the form of program modules or computer-executable instructions stored on a computer readable medium or in the form of an apparatus having means to process data stored on a database.

In one exemplary embodiment of the invention, an event sequence is examined, and a context for each of a plurality of event types is compiled. These contexts are then compared to determine a degree of similarity between the corresponding event types.

A context set is compiled by recording the events which occur within a predetermined time period of each occurrence of the event type. The context set may include event types which occur during the time period before each occurrence of the event type or event types both before and after the event type.

To compare the contexts, the context sets are transformed into vector representations and then the distance between the vectors is calculated. The context sets may be transformed into vectors having the same number of dimensions as the finite set of event types has elements, with each dimension corresponding to an event type and the value of each dimension being based on the number of times the corresponding event type occurs in the context set. The context sets may be transformed into centroid vectors.

Conventional distance calculations may be employed for determining the distance between vectors, such as the Euclidean distance formula.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

Determining a degree of relative similarity between event types in event sequences by examining the context of the event types facilitates similarity analysis of large sets of event sequences.

Exemplary Operating Environment

Figure 1:
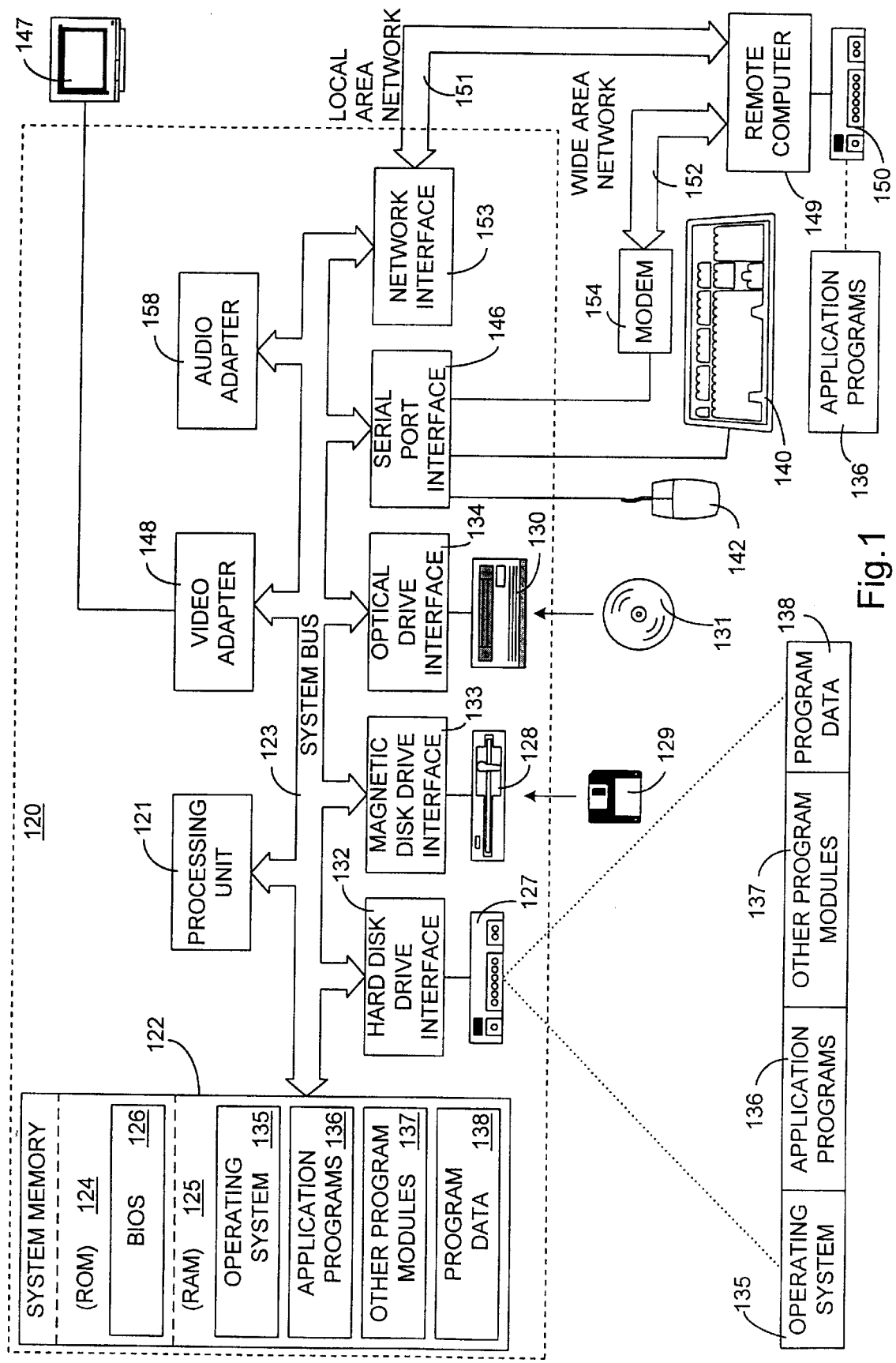
FIG. 1 illustrates an exemplary operating environment for determining similarity between event types in an event sequence by comparing their contexts.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129 and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk 127, a removable magnetic disk 129 and a removable optical disk 131, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk 127, magnetic disk 129, optical disk 131, ROM 124 or RAM 125, including an operating system 135, one or more application programs 136, other program modules 137, and program data 138. A database system 155 may also be stored on the hard disk, magnetic disk 129, optical disk 131, ROM 124 or RAM 125. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include local area network (LAN) 151 and a wide area network (WAN) 152. Such networking environments are commonplace in offices, enterprise-wide computer networks, intranets, and the Internet.

When using a LAN networking environment, personal computer 120 is connected to local network 151 through a network interface or adaptor 153. When used in a WAN networking environment, personal computer 120 typically includes a modem 154 or other means for establishing communication over wide area network 152, such as the Internet. Modem 154, which may be internal or external, is connected to system bus 123 via serial aport interface 146. In a networked environment, program modules depicted relative to personal computer 120, or portions thereof, may be stored in remote memory storage device 150. It will be appreciated that the network connections shown are exemplary and other means of establishing a communications link between the computers may be used.

Database System

Figure 2:
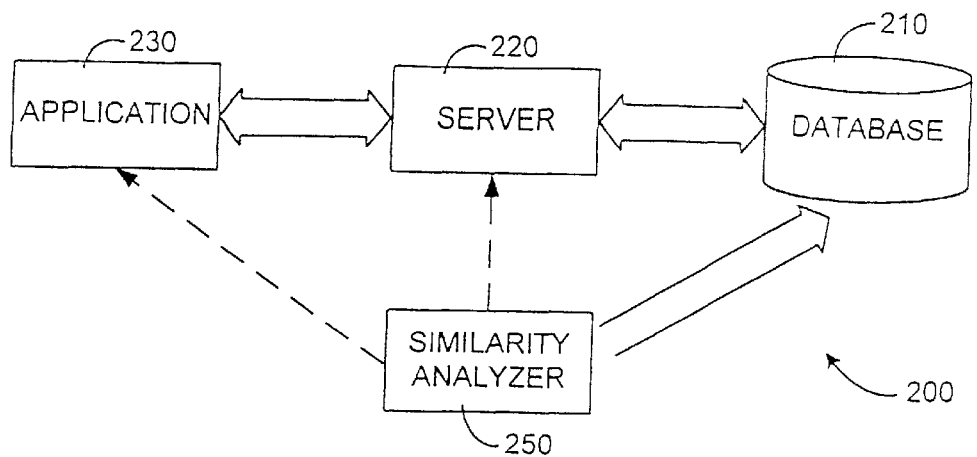
FIG. 2 illustrates, for one embodiment, a database system comprising a similarity tool for determining the similarity between event types.

FIG. 2 illustrates for one embodiment a computer database system 200 comprising a database 210, a database server 220, and a user application 230. Database system 200 may be resident on the personal computer 120 or may be remotely located from the personal computer. The database system 200 manages the storage and retrieval of data in database 210 in accordance with data manipulation statements or queries presented to database system 200 by a database application 230 or by a user, for example.

Database 210 comprises a set of data. While the data in a database takes many forms, the data pertinent to the present invention is sequential data, a set of data tuples which essentially comprises a list of pairs of events and times of occurrence. The tuples may have other data attributes and therefore be more complex than simple pairs, but for purposes of this explanation, simple tuples comprising pairs are discussed. The events belong to a set of m event types while the occurrence times may be in units of time or other indication of the relative chronological occurrence of the events.

The database server 220 controls the flow of data to and from the database 210. The server 220 may send data to the database 210 to be stored or process requests for data from outside sources such as the user application 230. The database 210 may store sequential data in the form of a log in which every occurrence an event type is added to the log's list of tuples. The event may occur during use of an application 230 such as a keystroke or the visiting of a web page, or may be routed from another source (not shown) through the server 220 and into the database 210, such as alarm data from remote sources.

A similarity analyzer 250, to be explained in detail below, accesses the database 210 to perform an analysis of the similarity of the event types stored in the log on the database 210. The results of this analysis may be used to update the application 230 or to provide insights helpful in programming the server 220 to more effectively manage the data in the database 210.

Figure 3:
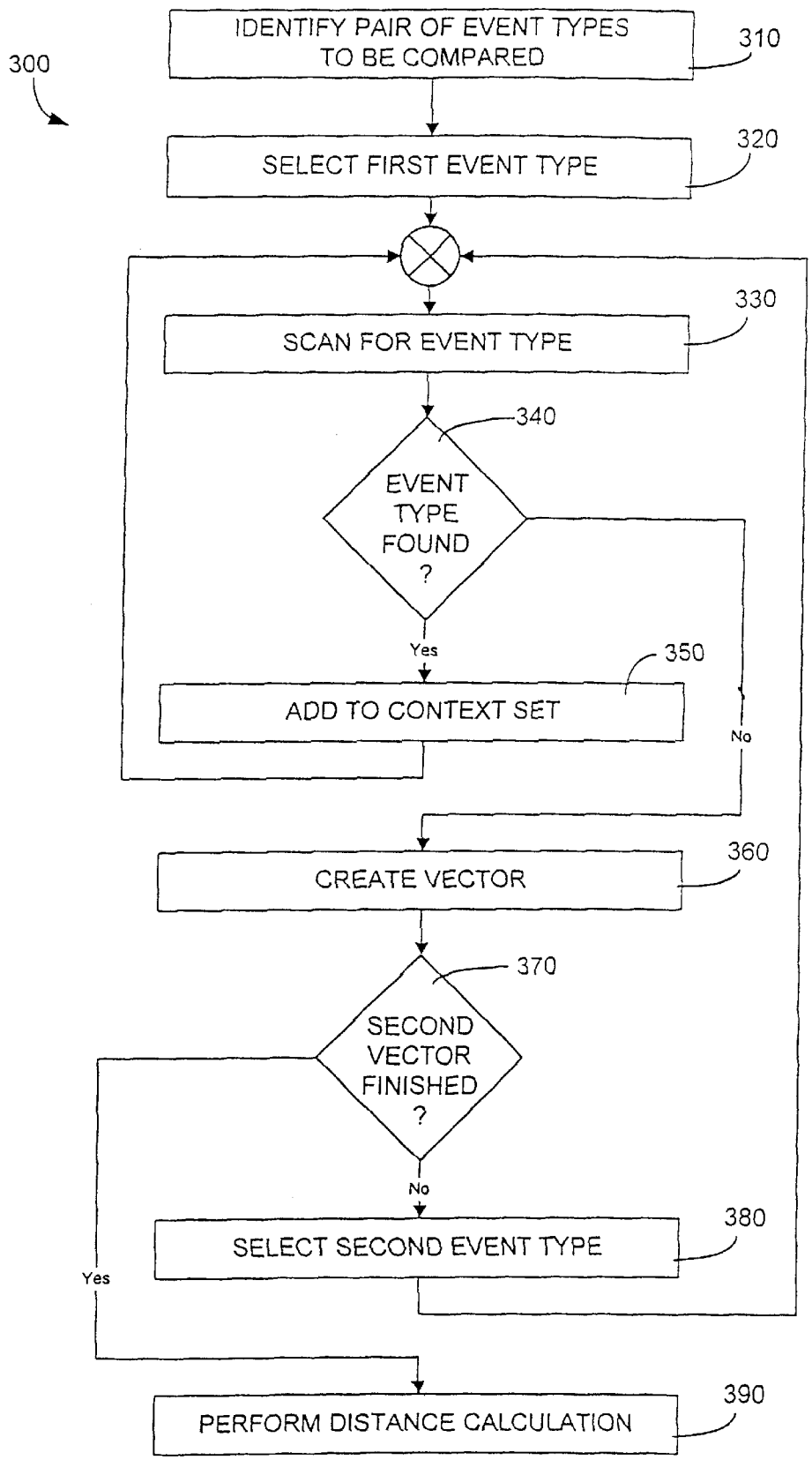
FIG. 3 illustrates, for one embodiment, a flow diagram of the method for determining similarity between event types.

Referring now to FIG. 3, a flow diagram 300 of the operation of the similarity analyzer is illustrated. While the flow diagram 300 refers specifically to a pair of event types to be compared, the analyzer may operate on multiple event using pairwise comparison. A pair of event types to be compared is identified in step 310. The method for identifying a pair of event types of interest is performed using other means, perhaps by selecting two event types which occur frequently. The first data type is selected in step 320. The sequential data is then scanned in step 330 for occurrences of the first event type selected in step 320.

When an occurrence of the first event type is found, the analyzer moves to step 350 in which the analyzer updates the context set for the first event type by adding to it events which occur within a given time period prior to this occurrence of the first event type. The appropriate time period varies widely with the type of data being analyzed, and depends greatly on the average amount of time between events in the sequence. A time period should be chosen to give an indication of event types which led up to the occurrence of the even type being analyzed, perhaps a few seconds for computer user keystrokes and minutes for telecommunications alarms, in where events happen more slowly. The analyzer then continues its scan of the database and adds events occurring within the prescribed time period until no more occurrences of the first event type are detected. The context set is now complete, and a decision box 340 branches to the step 360, transformation of the context set into a vector representation.

The context set is transformed into a centroid vector which represents the context set. The centroid vector has m dimensions, one for each possible event type in the event sequence. Each value of the vector corresponds to an event type. The value of each dimension is equal to the number of times the corresponding event type occurs in the context set times the reciprocal of the number of times the first event type occurred.

Via steps 370 and 380, steps 330 through 360 are performed for the second event type, resulting in a second context set and vector transformation. The similarity analyzer now moves to step 390, in which it calculates the distance between the two vector representations. Many formulae are known for calculating the distance between vectors, any of which can be used in accordance with the present invention. The formula used in this embodiment is the square root of the sum of the squares of the differences between corresponding dimensions in the vectors. The following example is aimed at illustrating more fully the operation of the similarity analyzer.

EXAMPLE 1

Figure 4:
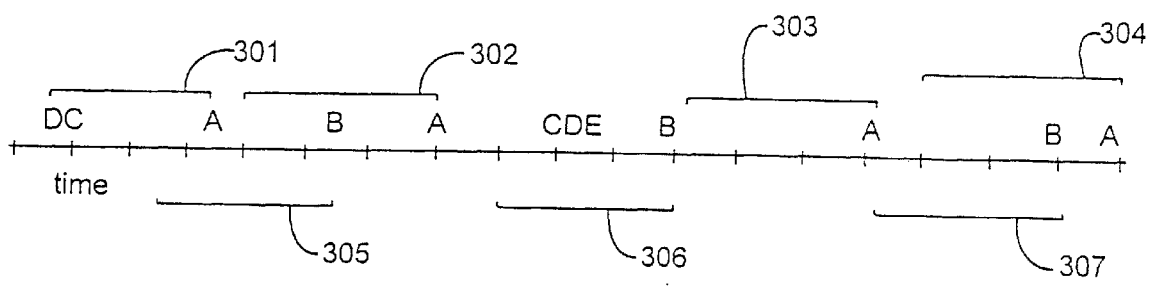
FIG. 4 illustrates an example of an event sequence.

FIG. 4 depicts an event sequence having a set of possible event types {A,B,C,D,E}. For this example, the similarity between event types A and B will be determined. The predetermined time period used in forming the context sets is three time units, designated by the hash marks along the time line.

The context set of event type A is compiled by scanning the sequence for occurrences of A. The first occurrence of A is noted as 301. Looking back three time units, event types D and C are added to the context set of A. The second occurrence of A 302 causes B to be added to the context set, the third occurrence 303 causes the null set to be added and the fourth occurrence 304 causes B to be added to the context set. The context set of A is complete and comprises the set {(D,C),B,Ø,B}.

A centroid vector representation of the context set of A is constructed. There were four occurrences of A in the event sequence, so a weight of one fourth will be assigned to each event in the context set. Event types A and E are not elements of the context set of A, so the value of their corresponding dimensions in the centroid vector is "0". Event type B occurs twice in the context set, so its value in the vector is two times one fourth or one half Event types C and D each occur once, so that their values in the vector are each one times one fourth or one fourth. The centroid vector representation of the context of A is therefore:

| A | B | C | D | E |
|---|---|---|---|---|
| 0 | .50 | .25 | .25 | 0 |

Next the context set of B is compiled as {A,(C,D,E,),Ø}. There were three occurrences of event type B in the sequence 305, 306, 307 so the weight of each event in the context set will be one third. Event types A,C,D, and E each occurred one time in the context set so their values in the vector representation will be one times one third or one third. Event type B is not an element of the context set so its corresponding value in the vector will be "0". The centroid vector representation of the context of B is therefore:

| A | B | C | D | E |
|---|---|---|---|---|
| .33 | 0 | .33 | .33 | .33 |

With both vector representations complete, the distance between the two is calculated using a standard Euclidean formula:

$$\sqrt{(A_A-A_B)^2+(B_A-B_B)^2+(C_A-C_B)^2+(D_A-D_B^2+E_A-E_B)^2}$$

$$\sqrt{(0-0.33)^2+(0.5-0)^2+(0.25-0.33)^2+(0.25-0.33)^2+(0-0.33)^2}=0.69$$

This distance serves as an indication of the degree of similarity between event types A and B.

In the foregoing description, the invention has been described with reference to specific exemplary embodiments thereof It will, however, be evident that various modifications and changes may be made thereto without departing from the broader spirit or scope of the present invention as defined in the appended claims. The specification and drawings are, accordingly, to be regarded in an illustrative rather that a restrictive sense.

We claim:

1. A method for determining the similarity between a plurality of event types occurring in an event sequence, wherein the event sequence is an ordered collection of events from a set of m event types with each event having an occurrence time, comprising:

(a) compiling a set of context events for each of the plurality of event types by compiling the set of events having an occurrence time within a predetermined period prior to each occurrence of the event type;

(b) transforming each set of context events into a vector representation by constructing an m dimensional centroid vector wherein each dimension corresponds to an event type and the value of each dimension is based on the number of times the event type occurs in the set of context events; and (c) calculating the distance between the vector representations.

2. A computer readable medium having computer executable instructions for performing steps for determining the similarity between a plurality of event types occurring in an event sequence, wherein the event sequence is an ordered collection of events from a set of m event types with each event having an occurrence time, the steps comprising:

(a) compiling a set of context events for each of the plurality of event types by compiling the set of events having an occurrence time within a predetermined period prior to each occurrence of the event type;

(b) transforming each set of context events into a vector representation by constructing an m dimensional centroid vector wherein each dimension corresponds to an event type and the value of each dimension is based on the number of times the event type occurs in the set of context events; and (c) calculating the distance between the vector representations.

\* \* \* \* \*